United States Patent
Kawakami et al.

(10) Patent No.: US 11,240,546 B2
(45) Date of Patent: Feb. 1, 2022

(54) SERVER AND PROGRAM

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/650,819

(22) PCT Filed: Dec. 21, 2018

(86) PCT No.: PCT/JP2018/047328
§ 371 (c)(1),
(2) Date: Mar. 25, 2020

(87) PCT Pub. No.: WO2019/131537
PCT Pub. Date: Jul. 4, 2019

(65) Prior Publication Data
US 2021/0092470 A1    Mar. 25, 2021

(30) Foreign Application Priority Data
Dec. 27, 2017    (JP) .............................. JP2017-252212

(51) Int. Cl.
*H04N 21/2668* (2011.01)
*H04N 21/239* (2011.01)
(Continued)

(52) U.S. Cl.
CPC ..... *H04N 21/2668* (2013.01); *H04N 21/2393* (2013.01); *H04N 21/472* (2013.01); *H04N 21/64761* (2013.01)

(58) Field of Classification Search
CPC .......... H04N 21/2668; H04N 21/2393; H04N 21/472; H04N 21/64761; H04N 21/21805;
(Continued)

(56) References Cited

U.S. PATENT DOCUMENTS

2013/0250121 A1* 9/2013 Piran ................... H04L 65/4084
348/159
2014/0152834 A1* 6/2014 Kosseifi ................ H04N 7/181
348/158

(Continued)

FOREIGN PATENT DOCUMENTS

| CN | 102036053 A | 4/2011 |
| CN | 106937128 A | 7/2017 |

(Continued)

OTHER PUBLICATIONS

International Search Report and Written Opinion for Application No. PCT/JP2018/047328, dated Mar. 12, 2019.

(Continued)

*Primary Examiner* — Alfonso Castro
(74) *Attorney, Agent, or Firm* — Dorsey & Whitney LLP

(57) ABSTRACT

An aspect of the present invention provides a server for controlling a camera video image to be distributed to an audience terminal for multi-camera video image distribution service for cyclic distribution of camera video images in a plurality of points of view to audience. The server includes a selector and a decider. The selector selects a plurality of candidates in each of selection opportunities that allow each audience member to select the camera video image to be distributed to the audience terminal. The decider decides the camera video image to be distributed to the audience terminal based on information indicating one of a plurality of options selected by each audience member. At least one of the plurality of candidates selected in at least one of the (Continued)

selection opportunities includes a common camera video image regardless of camera video images viewed by the audience when the plurality of candidates are selected.

20 Claims, 8 Drawing Sheets

(51) Int. Cl.
    *H04N 21/472*     (2011.01)
    *H04N 21/647*     (2011.01)

(58) Field of Classification Search
    CPC ........... H04N 5/23238; H04N 21/2187; H04N 21/23439; H04N 21/2365; H04N 21/2543; H04N 21/41407; H04N 21/4223; H04N 21/4307; H04N 21/4316; H04N 21/47205; H04N 21/47211; H04N 21/816
    USPC .................................................... 725/38, 59
See application file for complete search history.

(56) References Cited

U.S. PATENT DOCUMENTS

| | | | |
|---|---|---|---|
| 2017/0251204 A1* | 8/2017 | Gupte | .................. H04N 19/154 |
| 2019/0149853 A1* | 5/2019 | Crowe | ............... H04N 21/4316 725/59 |

FOREIGN PATENT DOCUMENTS

| | | |
|---|---|---|
| JP | 2012142860 A | 7/2012 |
| JP | 2013183209 A | 9/2013 |
| JP | 2016010145 A | 1/2016 |
| JP | 2016123069 A | 7/2016 |
| WO | 2017044795 A1 | 3/2017 |

OTHER PUBLICATIONS

English translation of Decision to Grant a Patent for JP Application No. 2017-252212, dated May 8, 2018.
English translation of Notice of Reasons for Refusal for JP Application No. 2017-252212, dated Feb. 27, 2018.
"GYO-Live Cruise", https://web.archive.org/web/20170716183422/http://live.nicovideo.jp/s/cruise, Feb. 16, 2017.
"Introducing New Functions Added by Niconico's New Interface Nicocas", nicoas Gzbrain Inc. https://www.famitsu.com/news/201711/28146962.html, Nov. 28, 2017, 1-14.
2nd Office Action for CN Application No. CN106937128A dated Jan. 15, 2021.

* cited by examiner

FIRST　　SECOND　　THIRD

FIRST   SECOND   THIRD

SERVER AND PROGRAM

RELATED APPLICATIONS

This application is a 371 National Stage application of International Application No. PCT/JP2018/047328, filed Dec. 21, 2018, which claims priority to Japanese Patent Application No. 2017-252212, filed on Dec. 27, 2017. The aforementioned applications are incorporated herein by reference, in its entirety, for any purposes.

TECHNICAL FIELD

The present invention relates to a multi-camera video image distribution system.

BACKGROUND ART

In sport game programs such as baseball or soccer, in general, a large number of cameras capture videos from different points of view at the same time to obtain the video images of the facial expressions of players who have scored goals and the bird's-eye view of the entire stadium at the same time. As typical broadcast contents, the time and the point of view to be selected and broadcasted are determined by broadcasters, not by the viewers. This is advantageous in providing viewers with a variety of video images without requiring any control, but fails to meet the demands of some viewers to focus on the actions of certain players, for example.

In the future, online service may appear, for example, which captures, with cameras from different points of view, video images of a virtual world including a large number of autonomously moving characters and streams the video images live. The service allows a big audience (i.e., a large number of viewers) to share the common experience of viewing the video images. In such online service, each audience member may wish to select the video image of a certain character.

In streaming such video images captured by (physical) cameras or virtual cameras in different points of view, there is a demand of each audience member to select a camera video image in a certain point of view. Simultaneous distribution of camera video images in all points of view allows each audience member to select a camera video image in a certain point of view. On the other hand, in order to provide the common experience of enjoying a camera video image in the same point of view with the other audience, there is a need to secure a certain number of audience viewing the camera video image in the same point of view by limiting the number of selectable points of view to some extent.

Japanese Unexamined Patent Publication No. 2011-82982 (e.g., Abstract) discloses a system for providing multi-angle broadcast service including a transmitter (e.g., a server) and receivers (i.e., viewers). The transmitter generates multi-screen video images (i.e., a plurality of options) and transmits the video images to the receivers. The receivers receive the multi-screen video images and decodes the source video images in accordance with the users' selection (i.e., second information). The receivers display video images (see, e.g., a to d of FIG. 2) relating to common points of view, regardless of the users' selection.

Japanese Unexamined Patent Publication No. 2013-183209 (e.g., paragraph [0036] and Abstract) discloses a system for streaming, via the Internet, video files captured by a multi-view content capture system. An interface is prepared which allows each user to freely and easily view a video image in the desired point of view. The system dynamically and adaptively allocates bandwidths to video streams. Specifically, when a user views a video image in a certain point of view, the system preferentially streams encoded broadband data on this video image and always streams encoded narrowband data on the other non-displayed video images.

SUMMARY OF THE INVENTION

For example, allowing each audience member to sequentially select a camera video image in the point of view the audience member would like to view next allows the audience member to select, out of options, a camera video image in a favorite point of view. Such cyclic distribution of camera video images may meet the demand of the audience. However, if each audience member completely freely selects the camera video image to be viewed, the camera video images that need to be simultaneously distributed are repeatedly divided each time the selection is made. Eventually, the audience may view completely different camera video images.

Simply with two options each time, the total number of camera video images to be viewed by the audience becomes larger than 100 after the seventh selection. Without securing a certain number of audience viewing a camera video image in the same point of view, the attraction of sharing the common experience of enjoying the camera video image in the same point of view with the other audience is impaired. There is thus a demand for a mechanism that avoids the spread of the audience over a large number of camera video images so as not to impair the attraction of sharing the common experience, while reflecting each audience member's intention in selecting the camera video image to be distributed.

It is an object of the present invention to reduce the spread of the audience over a large number of camera video images, while allowing each user of a multi-camera video image distribution service to select the camera video image to be viewed.

An aspect of the present invention provides a server for controlling a camera video image to be distributed to an audience terminal for multi-camera video image distribution service for cyclic distribution of camera video images in a plurality of points of view to audience. The server includes a selector, a generator, a transmitter, a receiver, and a decider. The selector selects a plurality of candidates in each of selection opportunities that allow each audience member to select the camera video image to be distributed to the audience terminal. The generator generates first information for presenting, to the audience, a plurality of options associated with the plurality of candidates selected. The transmitter transmits the first information to the audience terminal. The receiver receives second information indicating one of the plurality of options selected by each audience member. The decider decides the camera video image to be distributed to the audience terminal based on the second information. At least one of the plurality of candidates selected in at least one of the selection opportunities includes a common camera video regardless of camera video images viewed by the audience when the candidates are selected.

Another aspect of the present invention provides a server for controlling a camera video image to be distributed to an audience terminal for multi-camera video image distribution service for cyclic distribution of camera video images in a plurality of points of view to audience. The server includes a determiner, a selector, a generator, a transmitter, a receiver, and a decider. The determiner determines whether a predetermined condition is satisfied or not. The selector selects a plurality of first candidates in each of selection opportunities that allow each audience member to select the camera video image to be distributed to the audience terminal, if the predetermined condition is determined not to be satisfied. The generator generates first information for presenting, to the audience, a plurality of options associated with the plurality of first candidates selected, if the predetermined condition is determined not to be satisfied. The transmitter transmits the first information to the audience terminal, if the predetermined condition is determined not to be satisfied. The receiver receives second information indicating one of the plurality of options selected by each audience member, if the predetermined condition is determined not to be satisfied. The decider decides the camera video image to be distributed to the audience terminal based on the second information, if the predetermined condition is determined not to be satisfied. If the predetermined condition is determined to be satisfied, (a) the selector selects at least one common camera video as one of second candidates regardless of camera videos viewed by audience when the predetermined condition is satisfied, and (b) the decider decides, from the second candidates, the camera video image to be distributed to the audience terminal. A total number of the second candidates is smaller than a total number of the camera video images viewed by the audience when the predetermined condition is satisfied.

The present invention reduces the spread of the audience over a large number of camera video images, while allowing each user of the multi-camera video image distribution service to select the camera video to be viewed.

DESCRIPTION OF EMBODIMENTS

Figure 1:
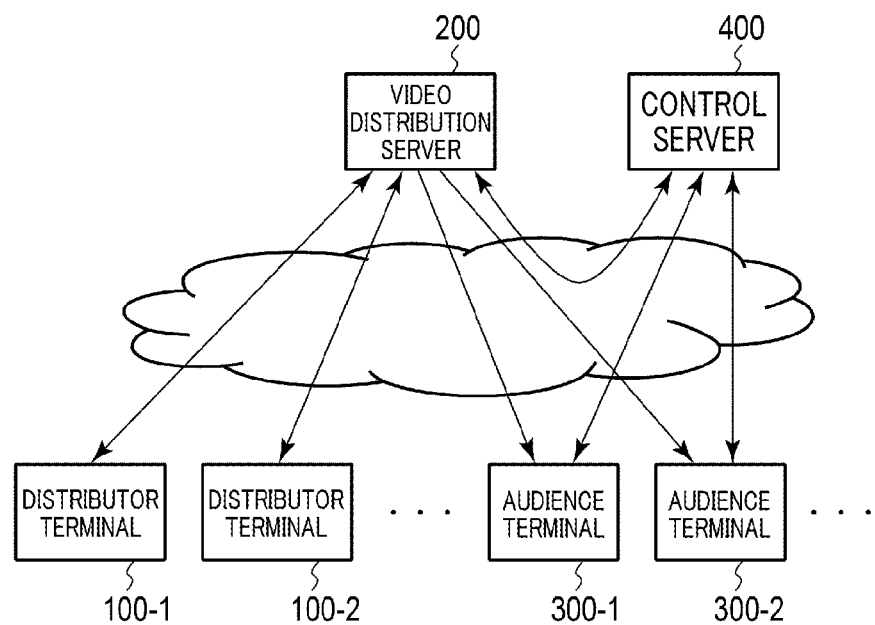
FIG. 1 is a block diagram showing an example multi-camera video image distribution system including a control server according to a first embodiment.

Now, embodiments will be described with reference to the drawings. The same or similar reference characters are hereinafter used to represent the same or similar elements to those already described, and the detailed explanation thereof will be basically omitted. For example, if there are the same or similar elements, a common reference character may be used to explain the elements without distinction, or suffix numbers may be used in addition to the common reference character to explain the elements with distinction.

First Embodiment

A control server according to a first embodiment may be incorporated in a multi-camera video image distribution system shown in FIG. 1. The multi-camera video image distribution system includes: distributor terminals 100-1, 100-2, . . . ; a video distribution server 200, audience terminals 300-1, 300-2, . . . ; and a control server 400. For convenience, the following description assumes that multi-camera video images are distributed live. This embodiment is however also applicable to distribution of recorded multi-camera video images.

In an example shown in FIG. 1, the video distribution server 200 provides, in cooperation with the control server 400 which will be described later, the audience terminals 300 with multi-camera video image distribution service. In the multi-camera video image distribution service, the control server 400 decides the camera video images (i.e., distribution video images) to be distributed to the audience terminals 300 next. The video distribution server 200 distributes the decided camera video images to the audience terminals 300 for a fixed period or a variable period, which may be extended or terminated as a result of questionnaire to the audience. The control server 400 again decides the camera video images to be distributed to the audience terminals 300 next. The control server 400 may cause each audience member to select the distribution video image in some or all of the opportunities to decide the distribution video image. In this manner, the control server 400 allows each user of the multi-camera video image distribution service to select the camera video image to be viewed. Then, the control server 400 imposes restriction, which will be described later, on the selection of candidates for video images to be distributed to the audience terminals 300 to concentrate the audience in a small number of camera video images, which may reduce the spread of the audience over a large number of camera video images and may eventually avoid an increase in the number of streaming to be used by the multi-camera video image distribution service.

The video distribution server 200 is connected to the distributor terminals 100, the audience terminals 300, and the control server 400 via a network to allow data transmission. Similarly, the control server 400 is connected to the video distribution server 200 and the audience terminals 300 via the network. The control server 400 transmits information (i.e., first information) for presenting options, which will be described later, to the audience terminals 300, receives information (i.e., second information) indicating the option selected by each audience terminal 300, and instructs the video distribution server 200 to distribute camera video images that should be distributed to the audience terminals 300, that is, distribution video images.

Note that the control server 400 may instruct the distributor terminals 100, in place of the video distribution server 200, to distribute the distribution video images. There is thus no need for the distributor terminals 100 to transmit camera video images in some points of view, which reduces the load onto the video distribution server 200.

The numbers of terminals or devices shown in FIG. 1 are illustrative only. For example, the number of the distributor terminals 100 and the number of the audience terminals 300 change from moment to moment and thus may be zero, hundreds, or thousands. In addition, a web server or a comment distribution server (not shown in FIG. 1) may be further placed, or such a function may be integrated into the video distribution server 200. Alternatively, the video distribution server 200 and the control server 400 may be integrated.

Each distributor terminal 100 may be, for example, an electronic device such as a computer connected to a plurality of video image sources such as (video) cameras. Examples of the electronic device include a television receiver (including an internet television), a personal computer (PC), a mobile terminal (e.g., a tablet, a smartphone, a laptop, a feature phone, a portable game player, a digital music player, and an electronic book reader), a virtual reality (VR) terminal, and an augmented-reality (AR) terminal. The distributor terminals 100 are not limited thereto. Each distributor terminal 100 sequentially transmits encoded video image data that is output from the video image sources to the video distribution server 200. Each distributor terminal 100 may not necessarily transmit camera video images in all points of view to the video distribution server 200, but may transmit camera video images only in some points of view, which are target images to be distributed, to the video distribution server 200. The point of view of the camera video image to be distributed may be decided by a distributor, or may be decided by the video distribution server 200 or the control server 400 (indirectly, the audience).

Each camera may be, for example, a camera attached to a smartphone or a camera attached to a PC. Each camera is not limited to a physical camera and may be a virtual camera capturing a virtual space such as a game space, or a combination (e.g., a camera capturing an AR space) of a physical camera and a virtual camera.

The distributor terminals 100 described herein are suitable for distribution of individually captured multi-camera video images, for example, but are mere examples of sources of video image in a multi-camera video image distribution system. Specifically, each distributor terminal 100 may be replaced with a server that collects and distributes video images in a plurality of points of views obtained by capturing games (e.g., sports, Japanese chess "Shogi", or a Japanese board game "Igo") or shows (e.g., plays or concerts) using a plurality of physical cameras. The terminal may be replaced with a (game) server that executes programs capable of capturing a virtual space using a plurality of virtual cameras.

The video distribution server 200 receives the encoded video image data sequentially transmitted from the distributor terminals 100. The video distribution server 200 then distributes the video image data to the audience terminals 300 (and the distributor terminals 100, if necessary) viewing the video image data. Although the audience terminals 300 may be electronic devices similar to the distributor terminals 100 but may not be necessarily connected to any video image source, unlike the distributor terminal 100.

The control server 400 controls the distribution video images. The control server 400 selects, from a plurality of camera video images distributable at present, a plurality of candidates for camera video images to be distributed to the audience terminals 300 next. The control server 400 then generates the information for presenting, to the audience terminals 300, a plurality of options associated with the candidates, and transmits the information to the audience terminals 300. Each audience terminal 300 returns information indicating the selected option. Based on this information, the control server 400 decides the camera video image to be distributed to the audience terminal 300 next and instructs the associated distributor terminal 100 or the video distribution server 200 to distribute this camera video image to the audience terminal 300.

The control server 400 may not always necessarily decide the distribution video images based on the selection by the audience, but may decide the distribution video images based on a predetermined algorithm. As will be described later, the control server 400 restricts the selection of the candidates for distribution video images to concentrate the audience in a small number of camera video images in at least some selection opportunities that allow each audience member to select the camera video image to be distributed to the audience terminal 300 next. This reduces an increase in the number of streaming due to the spread of the audience over a large number of camera video images, while allowing each user of the multi-camera video image distribution service to select the camera video image to be viewed.

Now, a configuration and an operation of the control server 400 in FIG. 1 will be described sequentially with reference to the drawings.

The control server 400 is a computer including a processor and a memory. The processor selects candidates for distribution video images, generates the information for presenting options, and decides distribution video images. The memory temporarily stores programs executed by the processor to perform such processing and data to be used by the processor, for example.

The control server 400 may use a communication device to be connected to the network. The communication device may be built in the control server 400 or may be externally attached to the control server 400.

The communication device communicates with the video distribution server 200 and the audience terminals 300 via the network. For example, the communication device receives information on the camera video images distributable at present, instructs the distributor terminals 100 or the video distribution server 200 to distribute the distribution video images, transmits the information for presenting the options to the audience terminals 300, and receives the information indicating the option selected by each audience member from the audience terminal 300.

Figure 2:
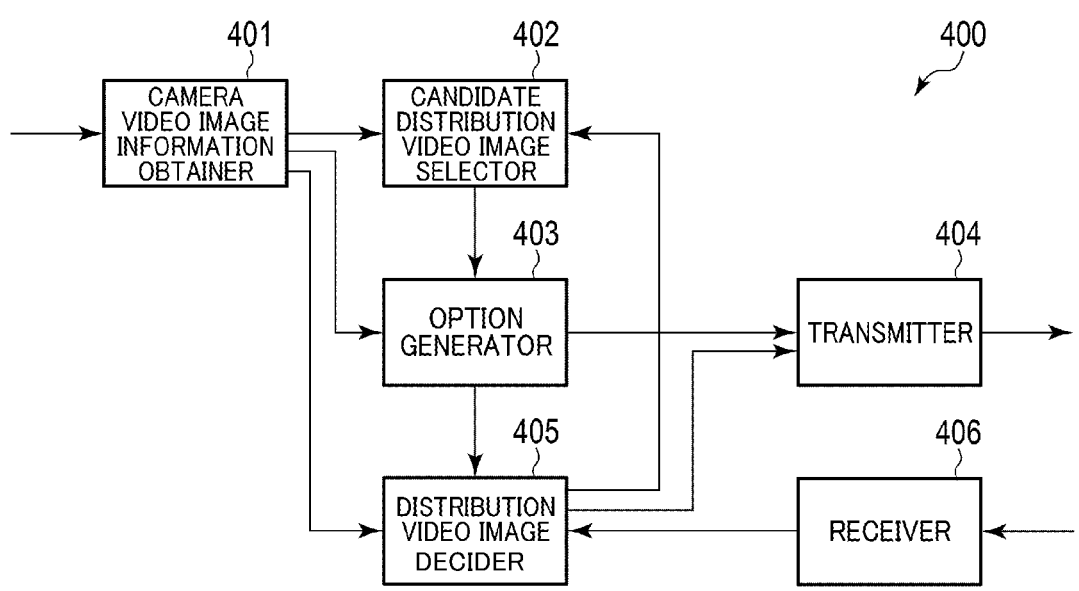
FIG. 2 is a block diagram illustrating the control server according to the first embodiment.

Now, the description of the example configuration of the control server 400 will be continued with reference to FIG. 2. The control server 400 shown in FIG. 2 includes a camera video image information obtainer 401, a candidate distribution video image selector 402, an option generator 403, a transmitter 404, a distribution video image decider 405, and receiver 406.

The camera video image information obtainer 401 obtains the information on the camera video images distributable at present, that is, selectable as distribution video images. The camera video image information obtainer 401 may receive the information on the camera video images from, for example, the distributor terminals 100 or the video distribution server 200 via the network. The camera video image information obtainer 401 may be the communication device described above or an interface with the communication device.

Examples of the information on the camera video images include information for identifying multi-camera video images and/or distributors thereof, information for identifying individual camera video images included in multi-camera video images, information indicating time slots for camera video images/multi-camera video images, metadata (e.g., camera imaging positions, imaging purposes, imaging targets, imaging methods, video tags (keywords), sponsor names, or program categories) attached to camera video images/multi-camera video images, comments of distributors, explanations, information on attributes of camera video images/multi-camera video images and/or distributors, the number of audience members of and/or comments on camera video images/multi-camera video images, thumbnail image data on camera video images/multi-camera video images, (video) data on camera video images/multi-camera video images, and comments posted to camera video images/multi-camera video images.

The camera video image information obtainer 401 transmits the information on the camera video images to the candidate distribution video image selector 402, the option generator 403, and the distribution video image decider 405. Note that the information on the camera video images may be stored, for example, in a storage (not shown) and referenced by the candidate distribution video image selector 402, the option generator 403, and the distribution video image decider 405 as appropriate. If the control server 400 is incorporated in the video distribution server 200, the camera video image information obtainer 401 is unnecessary.

The candidate distribution video image selector 402 receives, from the camera video image information obtainer 401, the information on the camera video images distributable at present. The candidate distribution video image selector 402 selects a plurality of candidates in each selection opportunity that allows each audience member to select a distribution video image. The candidate distribution video image selector 402 notifies the option generator 403 of the selected candidates. The candidate distribution video image selector 402 may be the processor and the memory described above.

The candidate distribution video image selector 402 may basically select the candidates based on any algorithm. For example, the candidate distribution video image selector 402 may randomly select the candidates or may apply different selectabilities depending on the factors included in the information on the camera video images, for example, the attributes of the camera video images/multi-camera video images and/or distributors, the metadata attached to the camera video images/multi-camera video images, the number of audience members of and/or comments on the camera video images/multi-camera video images. However, the candidate distribution video image selector 402 restricts the selection of candidates in at least some selection opportunities as will be described later. This reduces an increase in the number of streaming due to the spread of the audience over a large number of camera video images.

The option generator 403 is notified, by the candidate distribution video image selector 402, of the candidates selected in each selection opportunity. The option generator 403 generates the information for presenting, to the audience, a plurality of options associated with the candidates. In order to generate such information, the option generator 403 may use the information on the camera video images from the camera video image information obtainer 401. The option generator 403 transmits the generated information to the transmitter 404. The option generator 403 may be the processor and the memory described above.

The information generated by the option generator 403 may be, for example, data itself on the options to be displayed on the audience terminals 300 or the base data, or may be control data for controlling the audience terminals 300 to display the options.

With respect to the same candidates, the options displayed on a certain audience terminal 300 is not necessarily the same as those displayed on another audience terminal 300. For example, the options may be designed appropriately in accordance with the attributes of the audience members. This draws the attention of the members to the next distribution video image and motivates the members to continue using the multi-camera video image distribution service. However, since individual generation of the options for each audience member causes a high server load, the options may be managed based on each camera video image that is currently viewed (e.g., at the time of candidate selection) by the audience. Specifically, assuming that both the audience viewing a camera video image A and the audience viewing a camera video image B receive options associated with a camera video image C, these options may differ between the audiences. The audience members viewing the same camera video image are considered to have similar preferences to some extent, and the options attractive for the audience members may thus be similar. The different options may be different texts or images displayed on the audience terminals 300.

The transmitter 404 receives, from the option generator 403, the information for presenting the options to the audience in each selection opportunity. The transmitter 404 transmits this information to the audience terminals 300 via the network. The transmitter 404 may be the communication device described above or an interface with the communication device.

The transmitter 404 receives, from the distribution video image decider 405, the information indicating the decided distribution video images, identification information on, for example, the distribution video images (camera video images) or URLs. The transmitter then transmits the information to the distributor terminals 100 or the video distribution server 200 via the network.

The receptor 406 receives the information indicating the option selected by each audience member from the audience terminal 300 via the network. This information corresponds to the answer of each audience member to the information transmitted by the transmitter 404. That is, the received information indicates the option selected by the audience member from the plurality of options presented to the audience member based on the information transmitted by the transmitter 404. The receiver 406 transmits the received information to the distribution video image decider 405. The receiver 406 may be the communication device described above or an interface with the communication device.

The distribution video image decider 405 receives, from the receiver 406, the information indicating the option selected by each audience member. Based on this information, the decider decides the video image to be distributed to each audience member. The distribution video image decider 405 transmits the information indicating the decided distribution video image to the transmitter 404. The distribution video image decider 405 may be the processor and the memory described above.

For example, the distribution video image decider 405 may decide, as the video image to be distributed to each audience member, the camera video image associated with the option selected by the audience member. The video to be distributed to the audience members who have selected none of the options may be freely decided and may be, for example, the camera video image associated with the option selected by the greatest number of the audience.

The options selected by an extremely smaller number of the audience members may be ignored in view of reducing the spread of the audience. The video image to be distributed to the audience members who have selected such options may be decided in the same manner as the video image to be distributed to the audience members who have selected none of the options. Whether an extremely small number of audience members have selected an option may be determined by comparing, for example, the number or the ratio of the selected option to all the options with a threshold.

If the number of the options is smaller than the upper limit determined as the number of the distribution video images, for example, if the upper limit of the distributable video images is two in spite of three options presented, the distribution video image decider 405 may extract options up to the upper limit number in descending order of the number of the audience members who have selected the options and decide, as the distribution video images, the camera video images associated with the extracted options. The video image to be distributed to the audience members who have selected none of the extracted options may be decided like the video image to be distributed to the audience members who have selected none of the options.

Now, details of an operation of the candidate distribution video image selector 402 will be described with reference to FIGS. 3 to 7.

Figure 3:
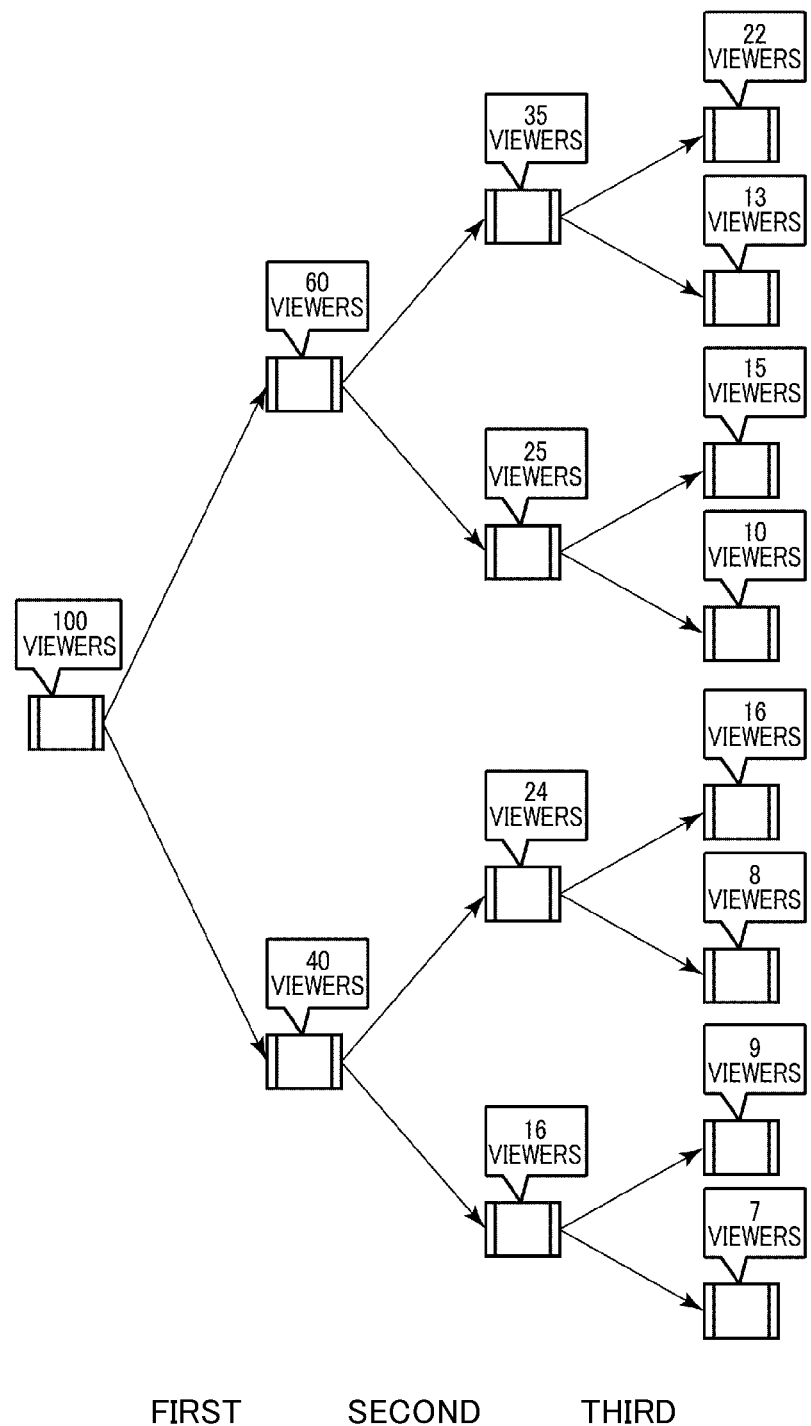
FIG. 3 illustrates the problem that arises if there is no restriction on the selection of candidates for camera video images to be distributed to audience terminals.

Assume that the candidate distribution video image selector 402 selects candidates without imposing any restriction, which will be described later, in all the selection opportunities and that the candidates do not overlap among the camera video images viewed by the audience at that time (when a plurality of candidates are selected). In this case, the total number of the distribution video images increases exponentially as illustrated in FIG. 3. That is, in each selection opportunity, the total number of the distribution video images doubles, and at the same time, the number of audience members viewing each distribution video image halves. After the third selection opportunity, the total number of distribution video images is eight, that is, the audience is spread over eight video images, and each video image has one eighth of the audience originally viewing the video image.

Figure 4:
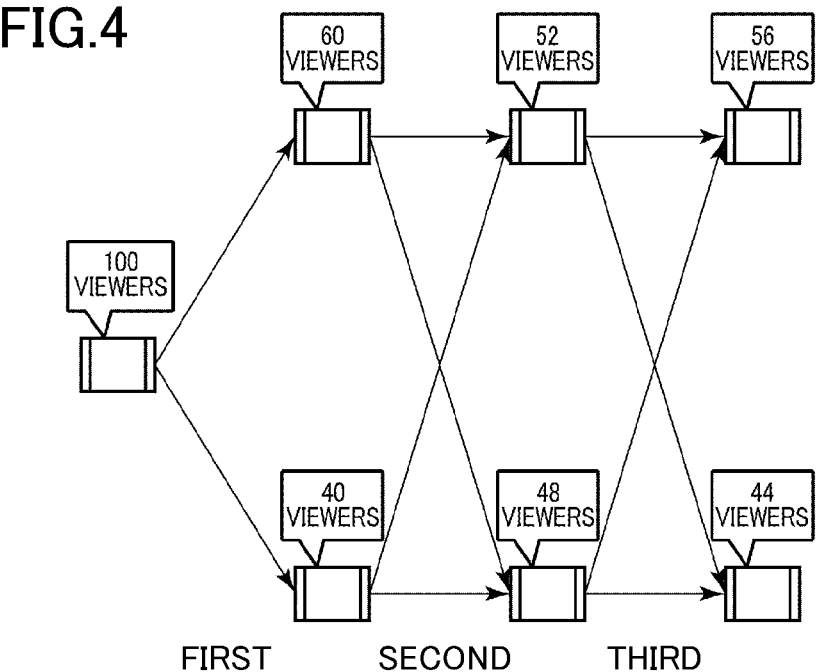
FIG. 4 is a conceptual diagram showing example control of the camera video images to be distributed to audience terminals 300 by the control server shown in FIG. 2.

Next, assume that the candidate distribution video image selector 402 selects a common camera video image as a candidate in all selection opportunities regardless of the camera video images viewed by the audience at that time. In this case, as illustrated in FIG. 4, the audience is not spread over a large number of camera video images. That is, even after repetitive selection opportunities, the same sets of camera video images may be selected from the respective camera video images by the audience next. The total number of distribution video images (the number of streaming) viewable by the audience (i.e., the video images that need to be distributed at the same time) is always a constant or lower, which is equal to the number of options presented to the audience in each selection opportunity, two in the example of FIG. 4.

This avoids an increase in the number of streaming due to the spread of the audience over a large number of camera video images, while giving the audience a sense of freely selecting camera video images. That is, even after repetitive selection opportunities, the number of audience members per distribution video image is maintained. The attraction of sharing the common experience of enjoying a camera video image in the same point of view with the other audience members is thus not impaired.

Figure 5:
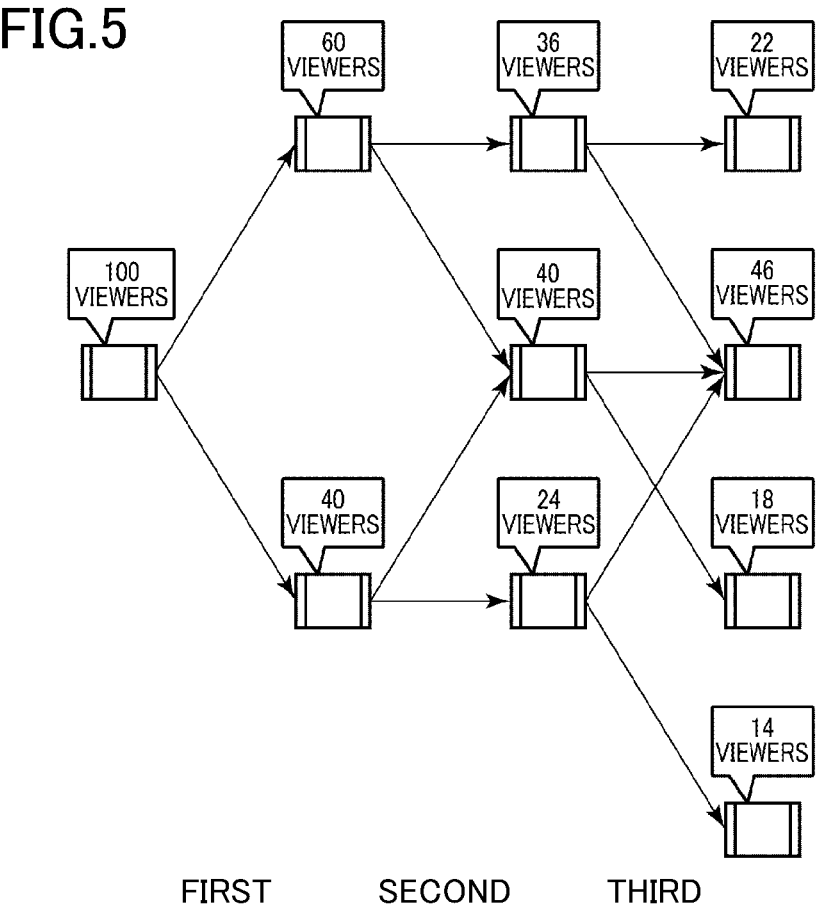
FIG. 5 is a conceptual diagram showing another example control of the camera video images to be distributed to the audience terminals 300 by the control server shown in FIG. 2.

Note that the restriction imposed on the candidate selection by the candidate distribution video image selector 402 are not limited to what is described with respect to FIG. 4. For example, the candidate distribution video image selector 402 may select a common camera video image as one of the candidates in all the selection opportunities regardless of the camera video images viewed by the audience at that time. Specifically, one of the camera video images selectable from the camera video images by the audience next may be common. In this case, as illustrated in FIG. 5, in each selection opportunity, the total number of distribution video images increments by one and the number of audience members per distribution video image decreases. However, as compared to the example in FIG. 3, the increase in the total number of distribution video images and the decrease in the number of audience members per distribution video image decelerate.

This reduces an increase in the number of streaming due to the spread of the audience over a large number of camera video images, while giving the audience a sense of freely selecting camera video images.

In the example of FIG. 5, in addition to the common camera video image described above, the candidates are individually selected based on each camera video image viewed by the audience at that time. The candidate distribution video image selector 402 may select the candidates depending on the information on, for example, the camera video image viewed by the audience at that time. This increases the chance to select the camera video images that meet the preference of the audience as compared to the example of FIG. 4.

Alternatively, the candidate distribution video image selector 402 may not necessarily impose the restriction on the candidate selection in all the selection opportunities. That is, the candidate distribution video image selector 402 may impose the restriction described with reference to FIGS. 4 and 5 on the candidate selection in at least one of the selection opportunities.

Figure 6:
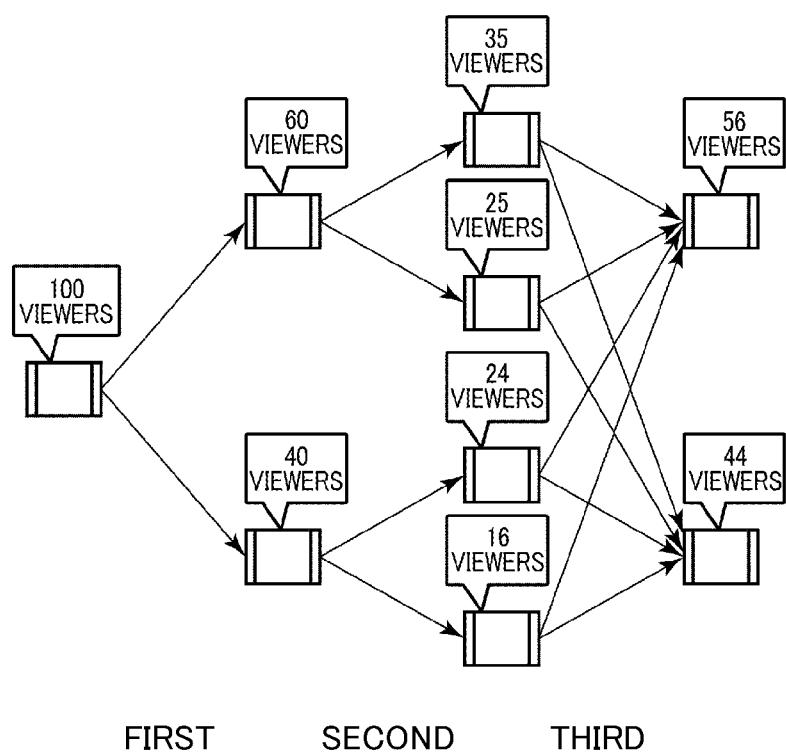
FIG. 6 is a conceptual diagram showing another example control of the camera video images to be distributed to the audience terminals 300 by the control server shown in FIG. 2.

For example, the candidate distribution video image selector 402 may impose no restriction on the candidate selection in the first and second selection opportunities and may select a common camera video in the third selection opportunity regardless of the camera video images viewed by the audience at the time of candidate selection. In this case, as illustrated in FIG. 6, the total number of distribution video images doubles and, at the same time, the number of audience members per distribution video image halves in each selection opportunity as in the example of FIG. 3, while no restriction is imposed on the candidate selection. However, the restriction is imposed on the candidate selection in the third selection opportunity, and thus, the total number of distribution video images is forcibly narrowed down to two at the maximum and the number of audience members per distribution video image returns to the standard after the first selection opportunity.

Figure 7:
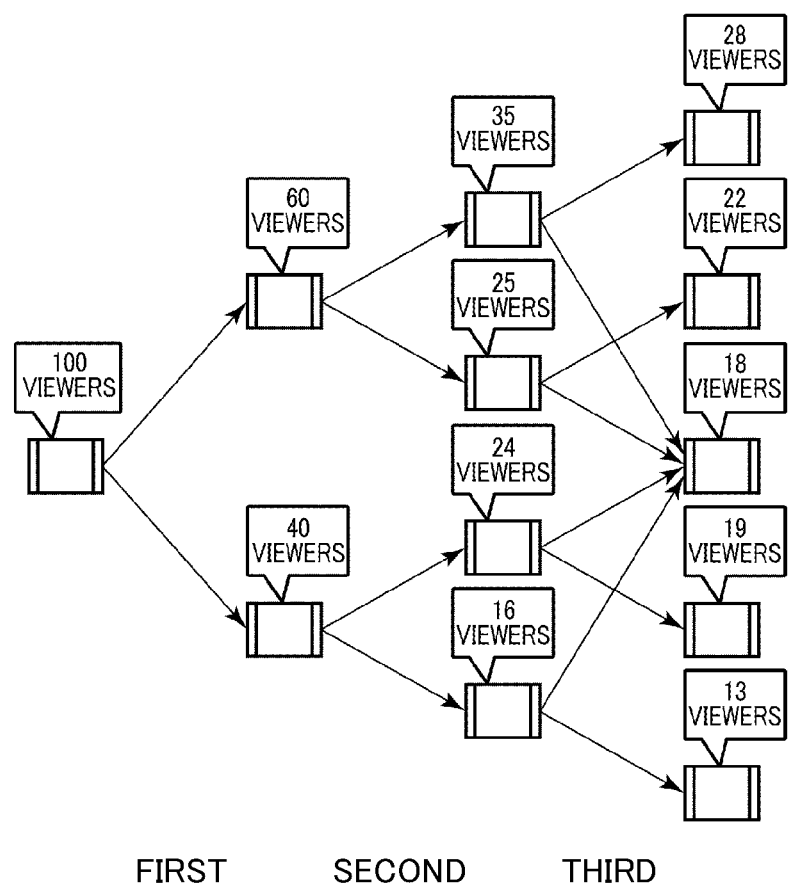
FIG. 7 is a conceptual diagram showing still another example control of the camera video images to be distributed to the audience terminals 300 by the control server shown in FIG. 2.

Alternatively, the candidate distribution video image selector 402 may impose no restriction on the candidate selection in the first and second selection opportunities and select (one) common camera video image as one of the candidates in the third selection opportunity regardless of the camera video images viewed by the audience at the time of candidate selection. In this case, as illustrated in FIG. 7, the total number of distribution video images doubles and, at the same time, the number of audience members per distribution video image halves in each selection opportunity as in the example of FIG. 3, while no restriction is imposed on the candidate selection. However, the restriction is imposed on the candidate selection in the third selection opportunity, and thus, the increase in the total number of distribution video images and the decrease in the number of audience members per distribution video image decelerate.

In this manner, the candidate distribution video image selector 402 imposes the restriction on the candidate selection. This reduces the total number of distribution video images viewable by the audience to a constant number or decelerates the increase in the total number of distribution video images and the decrease in the number of audience members per distribution video image. The candidate distribution video image selector 402 may always or intermittently impose such a restriction.

In the examples shown in FIGS. 4 to 7, the number of options presented to the audience is two but may be three or more. In these examples, the first distribution video image is common among all the audience, but each audience member may select the distribution video image from the beginning. The distribution video image is not always decided by the audience. For example, from when a selection opportunity is given to when the next selection opportunity is given, the distribution video image decider 405 may automatically decide one or a plurality of distribution video images. With a decrease in the frequency of giving the selection opportunities, there is no need for the audience to select options frequently (for example, every tens of seconds).

Figure 8:
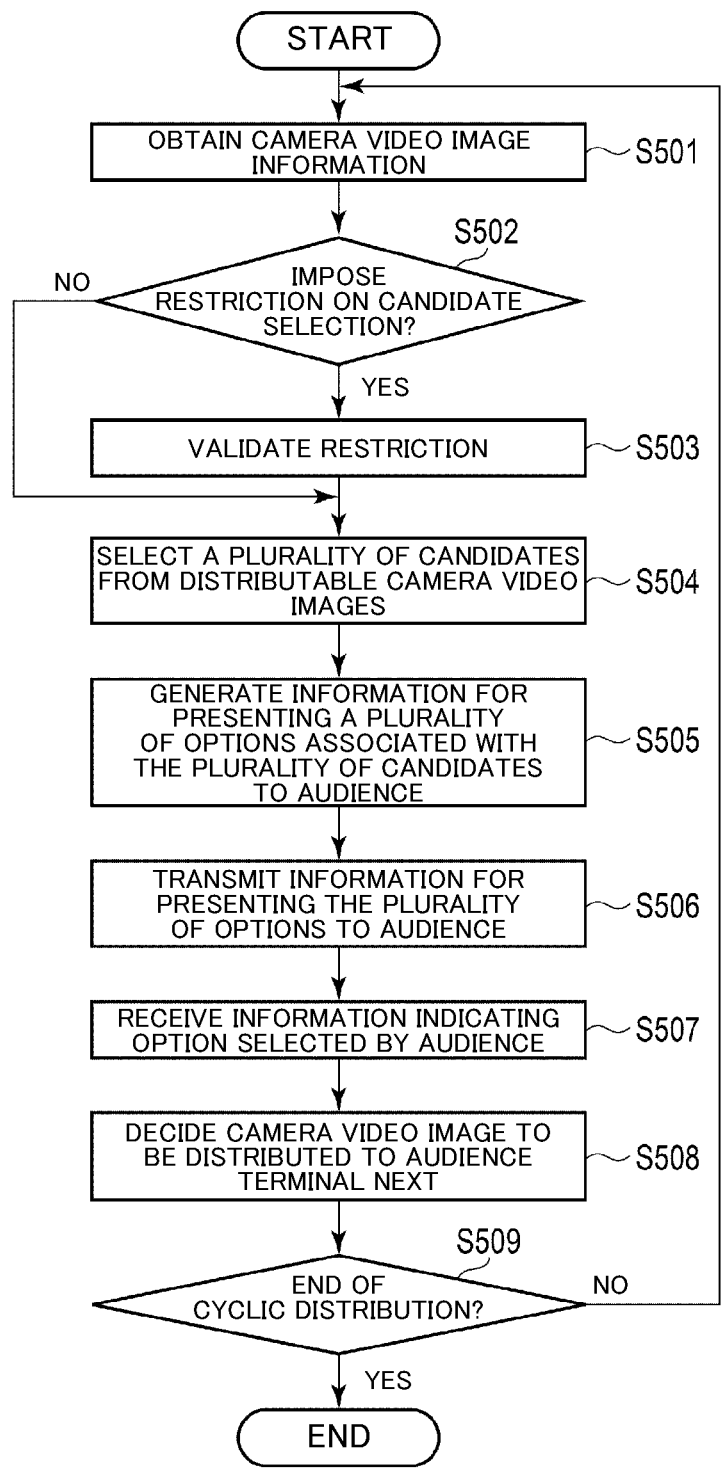
FIG. 8 is a flowchart illustrating an operation of the control server shown in FIG. 2.

Next, an example operation of the control server 400 will be described with reference to FIG. 8. The control server 400 repeats steps S501 to S508, which will be described below, in each selection opportunity to allow each audience member to select the distribution video image, until the end of the cyclic distribution of the camera video images. The cyclic distribution of the camera video images may be decided to end in a predetermined period, for example, every day, or may be performed without setting the time limit.

First, in step S501, the camera video image information obtainer 401 obtains information on the camera video images distributable at present by the video distribution server 200. The process then proceeds to step S502. As described above, steps S501 to S508 are repeated until the end of the cyclic distribution of the camera video images. However, if there is no need to update the information on the camera video images obtained at the execution of the past step S501, the execution of step S501 may be skipped.

In step S502, whether to impose the restriction on the candidate selection by the candidate distribution video image selector 402 is determined. For example, the restriction may be imposed every time, periodically or randomly, or may be imposed when a predetermined condition is satisfied (e.g., when the cumulative number of selections or the total number of distribution video images viewable by the audience reaches a predetermined number). If the restriction is to be imposed, the process proceeds to step S503. If no restriction is to be imposed, the process proceeds to step S504.

In step S503, the candidate distribution video image selector 402 validates the restriction on the candidate selection. The candidate distribution video image selector 402 may rewrite, for example, a flag for controlling the validity/invalidity of the restriction. Next to step S503, the process proceeds to step S504.

In step S504, the candidate distribution video image selector 402 selects a plurality of candidates for distribution video images from the camera video images distributable at present. In this step, the candidate distribution video image selector 402 may select the candidates based on the information on the camera video images obtained in step S501.

The candidate distribution video image selector 402 usually selects a plurality of candidates individually based on each camera video image viewed by the audience at present. However, if the restriction is validated in step S503, the candidate distribution video image selector 402 selects at least some common candidates regardless of the camera video images viewed by the audience at present.

The option generator 403 generates information for presenting, to the audience, the options associated with the candidates selected in step S504 (step S505). In this step, the option generator 403 may generate the information for presenting the options to the audience based on the information on the camera video images obtained in step S501.

If the restriction is validated in step S503, the candidates to be selected for an audience member viewing a certain camera video image overlap or match the candidates to be selected for an audience member viewing another camera video image. Even in this case, the option generator 403 may provide different options corresponding to the same candidate, between the camera video images viewed by the audience members.

For example, the option generator 403 may generate, for each camera video image viewed by the audience, the information for presenting options indicating the similarity between the information on the camera video image viewed by the audience and the information on the candidates for the subsequent distribution video image. This gives the audience a sense of selecting, as candidates, camera video images similar to the camera video image selected by themselves and viewed at present. That is, sudden presentation of options totally different from the options selected by the audience in the past is reduced. This allows the spread of the audience over a certain number of distribution video images or decelerates a decrease in the number of audience members per distribution video image, without causing the audience to feel strange.

The transmitter 404 transmits the information generated in step S505 to the audience terminals 300 via the network (step S506). Each audience terminal 300, which has received the information transmitted in step S506, presents the plurality of options based on the information. Each audience terminal 300 transmits the information indicating the option selected by the audience member to the control server 400 via the network. The receiver 406 then receives this information (step S507).

The distribution video image decider 405 decides the next distribution video image based on the information received in step S507 (step S508).

After the end of step S508, the control server 400 waits for the next selection opportunity until the end of the cyclic distribution of the camera video images (step S509). When the next selection opportunity comes, the process returns to step S501.

As described above, the control server according to the first embodiment restricts the selection of the candidates of the camera video images in at least one of the selection opportunities that allow each audience member to select the camera video image to be distributed to the audience member. This restriction is that at least some of the plurality of candidates to be selected are common regardless of the camera video images viewed by the audience at the time of candidate selection. Accordingly, this control server allows the spread of the audience over a certain number of distribution video images or decelerates the decrease in the number of audience members per distribution video image, while giving the audience a sense of freely selecting camera video images.

Second Embodiment

The control server according to the first embodiment described above restricts the selection of the candidates of the distribution video images in at least one selection opportunity that allows each audience member to select the camera video image (i.e., the distribution video image) to be distributed to the audience member. Accordingly, the control server allows the spread of the audience over a certain number of distribution video images or decelerates the decrease in the number of audience members per distribution video image, while giving the audience a sense of freely selecting camera video images.

On the other hand, a control server according to a second embodiment, which will be described below, basically allows each audience member to freely select distribution video images. However, if the total number of distribution video images viewable by the audience increases and exceeds an allowable range or there is such a fear, the server forcibly narrows down the total number of the distribution video images. This reduces the spread of the audience over a large number of camera video images, while giving the audience a sense of freely selecting camera video images.

The control server according to the second embodiment is partially similar to the control server 400 shown in FIG. 2. Differences between the servers will be mainly described below. An example control server according to this embodiment is shown in FIG. 9.

Figure 9:
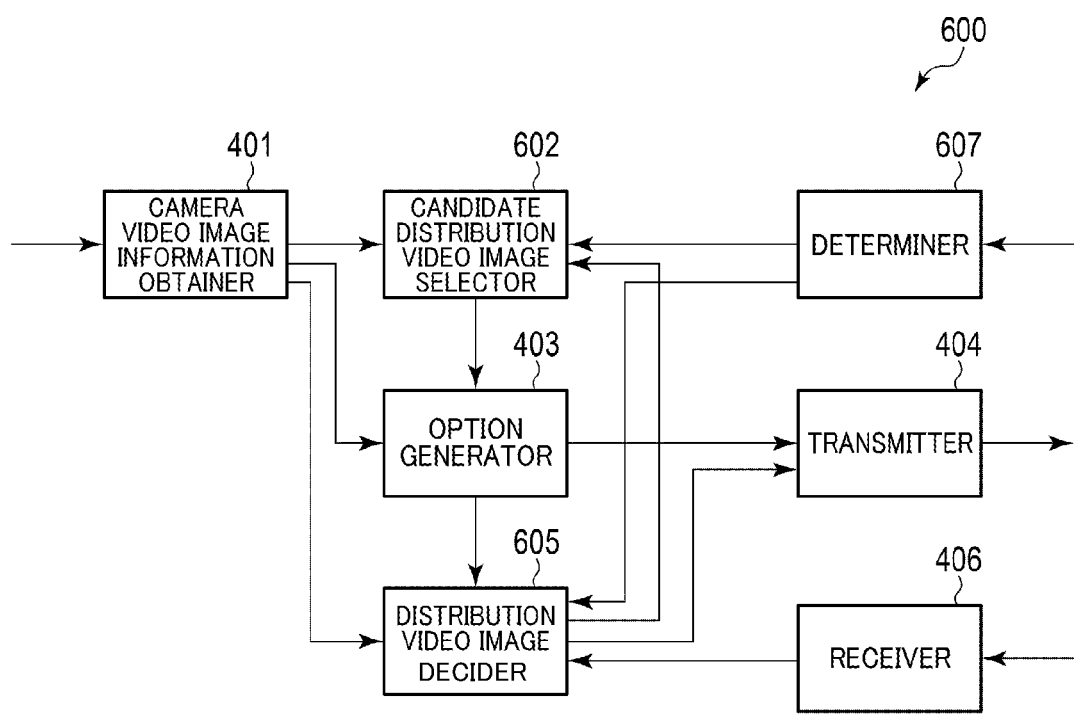
FIG. 9 is a block diagram illustrating a control server according to a second embodiment.
Figure 10:
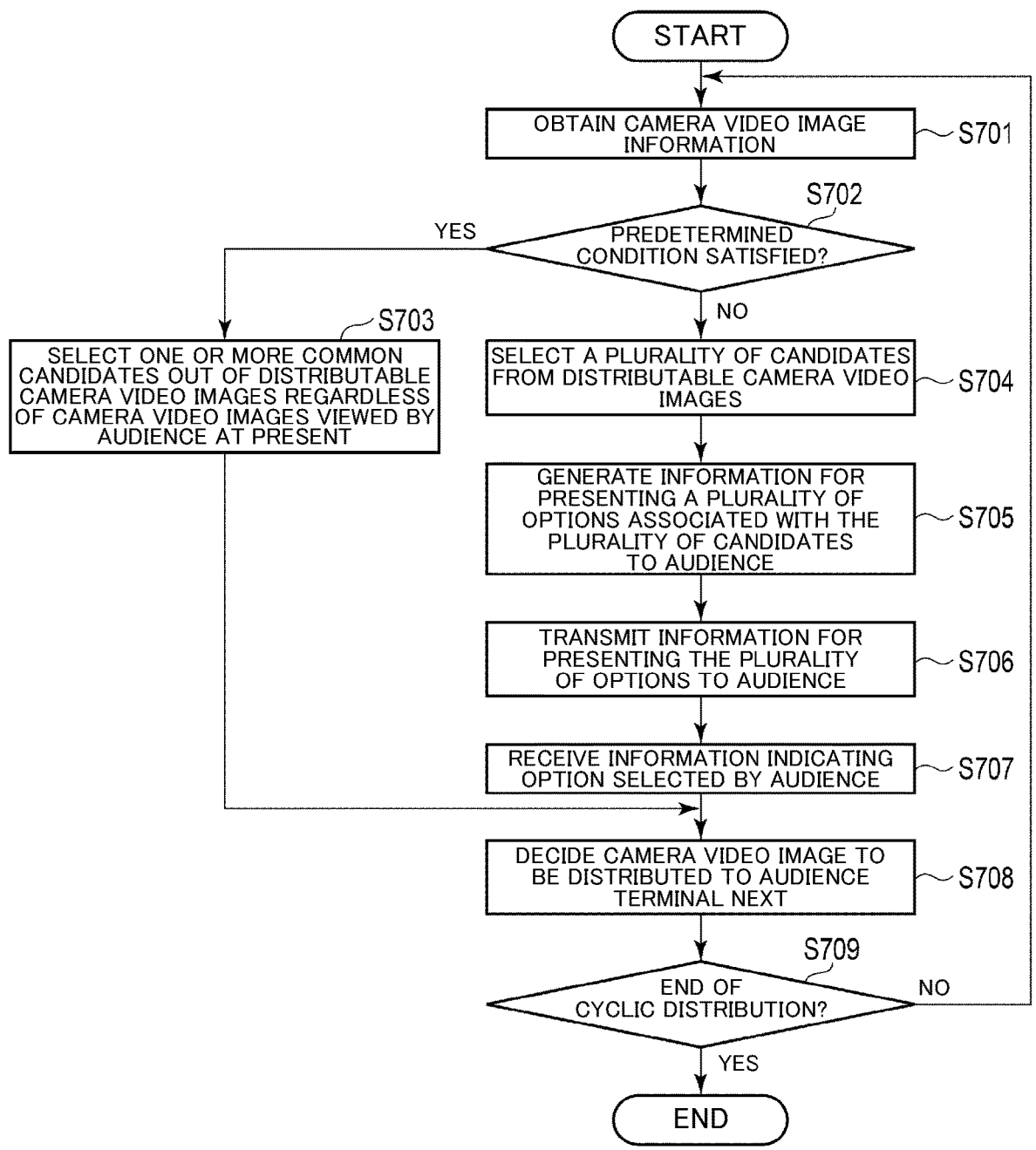
FIG. 10 is a flowchart illustrating an operation of the control server shown in FIG. 9.

A control server 600 shown in FIG. 9 includes a camera video image information obtainer 401, a candidate distribution video image selector 602, an option generator 403, a transmitter 404, a distribution video image decider 605, a receiver 406, and a determiner 607.

The determiner 607 determines whether a predetermined condition is satisfied or not. The predetermined condition is defined in advance as a condition for determining whether or not the total number of distribution video images viewable by the audience increases and exceeds an allowable range or whether or not there is such a fear.

Specifically, the predetermined condition may be that the cumulative number of selection opportunities given to the audience reaches a predetermined number. If each audience member completely freely selects the distribution video image, the total number of the distribution video images increases exponentially with respect to the selection opportunities. Thus, whether or not the total number of the distribution video images increases and exceeds an allowable range or whether or not there is such a fear may be determined by checking the cumulative number of the audience's selection opportunities which are highly correlated with the total number of the distribution video images, without receiving, from the video distribution server 200, the information on the total number of distribution video images viewable by the audience.

Alternatively, the predetermined condition is that the total number of distribution video images viewable by the audience reaches a predetermined number. The information on the total number of distribution video images viewable by the audience may be received from the video distribution server 200 or may be calculated based on the cumulative number of selection opportunities or an output from the distribution video image decider 605, for example.

If the predetermined condition is determined to be satisfied, the determiner 607 notifies the candidate distribution video image selector 602 and the distribution video image decider 605. The determiner 607 may be the processor and the memory described above.

The candidate distribution video image selector 602 is similar to the candidate distribution video image selector 402 in FIG. 2 but differs in at least the following points. Upon receipt of the notification from the determiner 607 indicating that the predetermined condition is satisfied, the candidate distribution video image selector 602 selects at least one common camera video image as a candidate regardless of the camera video images viewed by audience at that time (i.e., when the predetermined condition is satisfied). The total number of candidates may be one, or two or more, but is assumed to be smaller than the total number of camera video images viewed by the audience at that time. Accordingly, the total number of distribution video images viewable for the audience may be forcibly narrowed down. The candidate distribution video image selector 602 transmits the selected candidates to the distribution video image decider 605.

The distribution video image decider 605 is similar to the distribution video image decider 405 in FIG. 2 but differs in at least the following points. Upon receipt of the notification from the determiner 607 indicating that the predetermined condition is satisfied, the distribution video image decider 605 decides the distribution video image from the candidates selected by the candidate distribution video image selector 602, regardless of the selection of each audience member. For example, if the total number of candidates selected by the candidate distribution video image selector 602 is one, the distribution video image decider 605 may decide this candidate to be the video image to be distributed next to all the audience. On the other hand, if the total number of selected candidates is two, the distribution video image decider 605 may decide one of the candidates to be the next distribution video image on the basis, for example, of the audience viewing the same camera video image at present or each audience member. The distribution video image decider 605 may randomly decide the distribution video image or may decide, on the basis of the audience viewing the same camera video image at present, a candidate similar to that camera video image to be a distribution video image. If the candidate similar to the camera video image viewed by the audience at present is decided to be the distribution video image, each audience member cannot directly select a distribution video image but is induced to a camera video image (i.e., a distribution video image) similar to the camera video image selected by the audience themselves. Accordingly, the total number of distribution video images viewable by the audience may be forcibly narrowed down, without causing the audience to feel strange.

As described above, if the predetermined condition is satisfied, the distribution video image decider 605 decides the distribution video image regardless of the selection of the audience. That is, the option generator 403 does not generate any information for presenting options; the transmitter 404 does not transmit such information; and the receiver 406 does not receive any information indicating the option selected by each audience member.

Next, an example operation of the control server 600 will be described with reference to FIG. 9. The control server 600 repeats steps S701 to S708 described below in each selection opportunity that allows the audience to select the distribution video images, until the end of the cyclic distribution of the camera video images.

First, in step S701, the camera video image information obtainer 401 obtains the information on the camera video image distributable at present by the video distribution server 200. The process then proceeds to step S702. As described above, steps S701 to S708 are repeated until the end of the cyclic distribution of the camera video images. However, if there is no need to update the information on the camera video images obtained at the execution of the past step S701, the execution of step S701 may be skipped.

In step S702, the determiner 607 determines whether a predetermined condition is satisfied or not. If the predetermined condition is determined to be satisfied, the process proceeds to step S703. If not, the process proceeds to step S704.

In step S703, the candidate distribution video image selector 602 selects, out of the camera video images distributable at present, one or more common candidates regardless of the camera video images viewed by the audience at present. In this step, the candidate distribution video image selector 602 may select the one or more candidates based on the information on the camera video images obtained in step S701. After step S703, the process proceeds to step S708.

In step S704, the candidate distribution video image selector 602 selects, out of the camera video images distributable at present, a plurality of candidates for distribution video images based on each of the camera video images viewed by the audience at present. In this step, the candidate distribution video image selector 602 may select the plurality of candidates based on the information on the camera video images obtained in step S701.

The option generator 403 generates the information for presenting, to the audience, a plurality of options associated with the plurality of candidates selected in step S704 (step S705). In this step, the option generator 403 may generate the information for presenting the options to the audience based on the information on the camera video images obtained in step S701.

The transmitter 404 transmits the information generated in step S705 to the audience terminals 300 via the network (step S706). Each audience terminal 300, which has received the information transmitted in step S706, presents the plurality of options based on the information. Each audience terminal 300 transmits information indicating the option selected by the audience member to the control server 600 via the network. The receiver 406 then receives this information (step S707).

The distribution video image decider 605 decides the next distribution video image (step S708). Specifically, if the predetermined condition is determined to be satisfied in step S702, the distribution video image decider 605 decides the next distribution video image from the one or more candidates selected in step S703 based on a predetermined algorithm. On the other hand, if the predetermined condition is not determined to be satisfied in step S702, the distribution video image decider 605 decides the next distribution video image, out of the plurality of candidates selected in step S704, based on the information received in step S707.

After the end of step S708, the control server 600 waits for the next selection opportunity until the end of the cyclic distribution of the camera video images (step S709). When the next selection opportunity comes, the process returns to step S701.

As described above, the control server according to the second embodiment basically allows each audience member to freely select a distribution video image. However, if the predetermined condition is determined to be satisfied, the server forcibly narrows down the total number of the distribution video images viewable by the audience. Specifically, this control server selects one or more common candidates, the number of which is smaller than the total number of camera video images viewed by the audience at present, regardless of the distribution video images viewed by the audience at present. Out of the selected candidates, the server decides the next distribution video image on the basis of the audience viewing the same camera video, on the basis of each audience member, or in common for all the audience. Accordingly, this control server reduces the spread of the audience over a large number of camera video images, while giving the audience a sense of freely selecting camera video images.

The embodiments described above are mere specific examples for easier understanding of the concept of the present invention and are not intended to limit the scope of the invention. In the embodiments, various elements may be added, omitted, or replaced without departing from the spirit and scope of the invention.

The various functional units described above in the embodiments may be implemented using circuits. Each circuit may be a dedicated circuit for implementing a specific function, or may be a general-purpose circuit such as a processor.

At least a part of the processing in the embodiments described above may also be implemented by using a general-purpose computer as basic hardware. The programs implementing the above processing may be stored, and provided, in a computer-readable recording medium. The programs are stored in the recording medium as files in an installable format or files in an executable format. Examples of the recording medium include a magnetic disk, an optical disk (e.g., a CD-ROM, a CD-R, and a DVD), a magneto-optical (MO) disk, and a semiconductor memory. The recording medium may be of any type as long as it is capable of storing programs and readable by a computer. Alternatively, programs implementing the processing described above may be stored in a computer (or a server) connected to a network such as the Internet, and downloaded to computers (i.e., clients) via the network.

The invention claimed is:

1. A server for controlling a camera video image to be distributed to an audience terminal for multi-camera video image distribution service for cyclic distribution of camera video images in a plurality of points of view to audience, the server comprising:

a processor configured to determine whether a predetermined condition is satisfied or not, and further configured to select a plurality of first candidates in each of selection timings that allow each audience member to select the camera video image to be distributed to the audience terminal, if the predetermined condition is determined not to be satisfied, and further configured to generate respective first information for each audience member, wherein the respective first information for a particular audience member is based on each camera video image that is currently viewed by the particular audience member, wherein the respective first information is for presenting each audience member a respective plurality of options associated with the plurality of first candidates selected, if the predetermined condition is determined not to be satisfied;

a transmitter configured to transmit the first information to the audience terminal, if the predetermined condition is determined not to be satisfied; and a receiver configured to receive second information indicating one of the plurality of options selected by each audience member, if the predetermined condition is determined not to be satisfied, wherein the processor is further configured to decide the camera video image to be distributed to the audience terminal based on the second information, if the predetermined condition is determined not to be satisfied, and wherein if the predetermined condition is determined to be satisfied, (a) the processor is configured to select at least one common camera video image as one of second candidates regardless of camera video images viewed by the audience when the predetermined condition is satisfied, and (b) the processor is further configured to decide, from the second candidates, the camera video image to be distributed to the audience terminal, and a total number of the second candidates is smaller than a total number of the camera video images viewed by the audience when the predetermined condition is satisfied.

2. The server of claim 1, wherein
at least one of the plurality of candidates selected in each of the selection timings is a common camera video image regardless of the camera video images viewed by the audience when the plurality of candidates are selected.

3. The server of claim 1, wherein
each of the plurality of candidates selected in each of the selection timings is a common camera video image regardless of the camera video images viewed by the audience when the plurality of candidates are selected.

4. The server of claim 1, wherein
the predetermined condition is that a cumulative number of the selection opportunities given to the audience reaches a predetermined number.

5. The server of claim 1, wherein
the predetermined condition is that a total number of distribution video images viewable by the audience reaches a predetermined number.

6. The server of claim 1, wherein the plurality of candidates selected in the at least one of the selection timings are common camera video images regardless of the camera video images viewed by the audience when the plurality of candidates are selected.

7. The server of claim 1, configured to instruct to distribute the camera video image.

8. The server of claim 1, wherein the total number of the second candidates is always the same.

9. The server of claim 1, wherein the predetermined condition is determined to be satisfied in at least one of selection timings.

10. The server of claim 1, wherein the processor is further configured to automatically decide one of the plurality of first candidates or second candidates in at least one of the selection timings.

11. A non-transitory computer readable storage medium storing program, executable by a computer, for allowing the computer to control a camera video image to be distributed to an audience terminal for multi-camera video image distribution service for cyclic distribution of camera video images in a plurality of points of view to audience, the server allowing the computer to execute functions comprising:
determining whether a predetermined condition is satisfied or not;
selecting a plurality of first candidates in each of selection timings that allow each audience member to select the camera video image to be distributed to the audience terminal, if the predetermined condition is determined not to be satisfied;

generating respective first information for each audience member, wherein the respective first information for a particular audience member is based on each camera video image that is currently viewed by the particular audience member, wherein the respective first information is for presenting each audience member a respective plurality of options associated with the plurality of first candidates selected, if the predetermined condition is determined not to be satisfied;

transmitting the first information to the audience terminal, if the predetermined condition is determined not to be satisfied;

receiving second information indicating one of the plurality of options selected by each audience member, if the predetermined condition is determined not to be satisfied; and deciding the camera video image to be distributed to the audience terminal based on the second information, if the predetermined condition is determined not to be satisfied, wherein if the predetermined condition is determined to be satisfied, (a) selecting the plurality of first candidates includes selecting at least one common camera video image as one of second candidates regardless of camera video images viewed by the audience when the predetermined condition is satisfied, and (b) deciding, from the second candidates, the camera video image to be distributed to the audience terminal, and a total number of the second candidates is smaller than a total number of the camera video images viewed by the audience when the predetermined condition is satisfied.

12. The non-transitory computer readable storage medium of claim 11, wherein the plurality of candidates selected in the at least one of the selection timings are common camera video images regardless of the camera video images viewed by the audience when the plurality of candidates are selected.

13. The non-transitory computer readable storage medium of claim 11, wherein at least one of the plurality of candidates selected in each of the selection timings is a common camera video image regardless of the camera video images viewed by the audience when the plurality of candidates are selected.

14. The non-transitory computer readable storage medium of claim 11, wherein each of the plurality of candidates selected in each of the selection timings is a common camera video image regardless of the camera video images viewed by the audience when the plurality of candidates are selected.

15. The non-transitory computer readable storage medium of claim 11, wherein the predetermined condition is that a cumulative number of the selection timings given to the audience reaches a predetermined number.

16. The non-transitory computer readable storage medium of claim 11, wherein the predetermined condition is that a total number of distribution video images viewable by the audience reaches a predetermined number.

17. The non-transitory computer readable storage medium of claim 11, wherein the functions further comprise instructing to distribute the camera video image.

18. The non-transitory computer readable storage medium of claim 11, wherein the total number of the second candidates is always the same.

19. The non-transitory computer readable storage medium of claim 11, wherein the predetermined condition is determined to be satisfied in at least one of selection timings.

20. The non-transitory computer readable storage medium of claim 11, further comprising automatically deciding one of the plurality of first candidates or second candidates in at least one of the selection timings.

* * * * *